United States Patent Office 3,407,022
Patented Oct. 22, 1968

3,407,022
CONTROL OF GAS FLAME CHARACTERISTICS
Ronald William John Andrews, John Raymond Kenward, and John Reginald Dewhurst, London, England, assignors to South Eastern Gas Board
Filed Nov. 4, 1966, Ser. No. 592,217
7 Claims. (Cl. 431—8)

ABSTRACT OF THE DISCLOSURE

An automatic regulating arrangement for simultaneously controlling the flame and total heat release of a working gas burner supplied with a gas/air mixture in adjustable proportions and at a variable controlled pressure. A first control burner is supplied with the gas/air mixture at the same controlled pressure and the heat release from its combustion is sensed by means of a temperature-responsive element, e.g., the Wobbe Number Recorder, whose output signal is utilized to regulate the controlled pressure of the gas/air mixture in such a way as to keep the total heat release of the first control burner and of the working burner constant. In addition a second control burner, of Bunsen type, is supplied with the same gas/air mixture but at a governed constant pressure, and variations in the blue cone height of the flame of the Bunsen burner are sensed by means of a thermocouple, whose output signal is utilized to operate a motorized proportioning valve by which the proportions of gas and air in the said mixture are automatically adjusted in such a way as to regulate the blue cone height of the Bunsen burner flame to a constant value and also to regulate the flame height of the working burner flame to a constant value without disturbance of its total heat release. The thermocouple junction in the second control burner of Bunsen type is enclosed in a hollow metal shield of tapered form arranged vertically in the burner flame with its pointed upper end located above the apex of the blue cone, the lower end of the shield being smoothly rounded.

---

Figure 1:
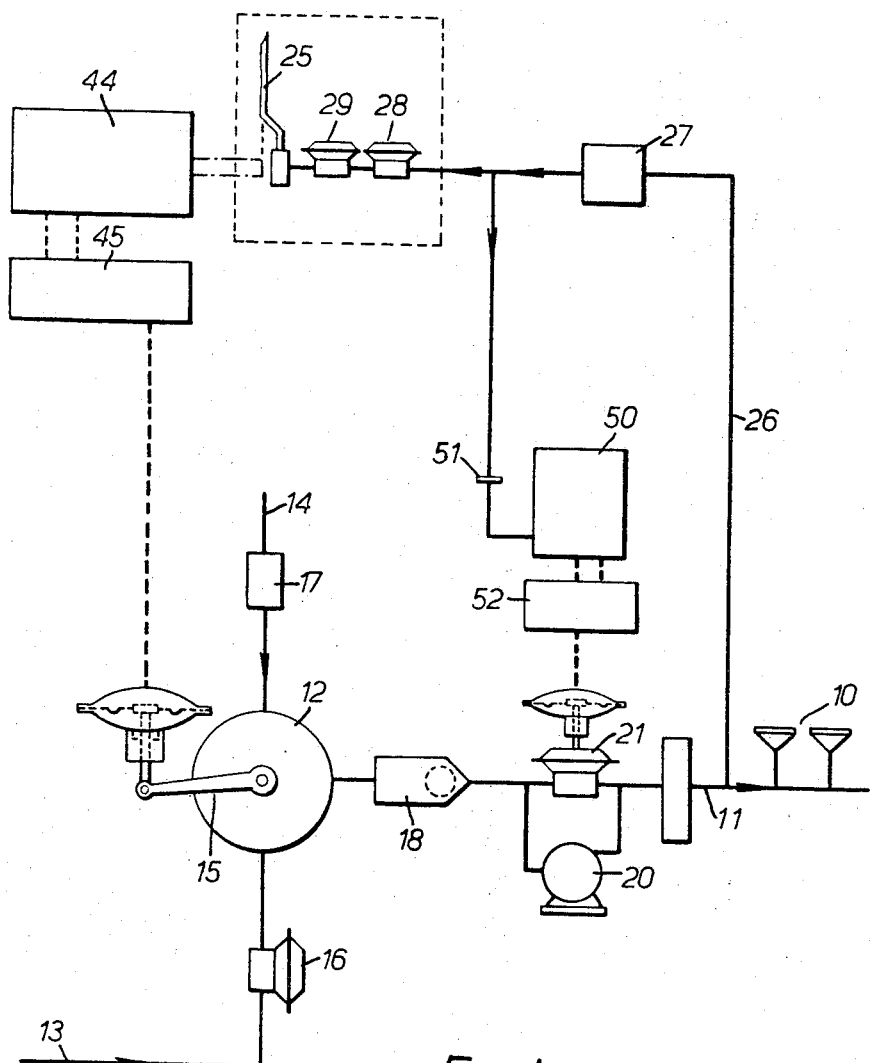

This invention relates to the control of the characteristics of a gas flame used for heating a workpiece as a stage in a manufacturing process, and has particular reference to the control of the flame geometry and of the heat release from the flame.

In certain industrial uses of gas for heating by flame, it is important that the size of and heat release from the flames should remain constant. Examples of these processes are the working of glass in automatic machines, such as are used in the production of electric lamps, and the automatic soldering of metal boxes, e.g. cans for tinned foods. In these processes the article to be heated, for example a glass tube, is held within a flame for a short fixed period during which the temperature has to be raised to a value which is within a narrow range. In general the flames are highly aerated and are obtained by entraining town gas in a jet of air supplied under pressure. It is common experience that the normal variations in the characteristics of town gas, which are of no significance in normal heating processes, can affect the size of the flame to such an extent that the glass becomes too hot and therefore too soft, or, if the change is in the opposite direction, the glass may not be sufficiently heated and will then break when the subsequent moulding operation is carried out. Similarly, in the case of the soldering of metal boxes the change in gas characteristics may result in insufficient or excessive heating leading to a poor seal or damage of the printing.

It is well known that the heat input to a gas appliance operating under constant gas pressure is directly proportional to the Wobbe Number of the gas, which is defined as the calorific value divided by the square root of the specific gravity. It is to be expected therefore that if the Wobbe Number of the gas supplied to a set of automatic machines varies appreciably, there will be a variation in the temperature of the work being heated, e.g. the glass or solder as the case may be. Nevertheless experience has shown that this is not the only factor of importance. Even when the Wobbe Number of the gas is constant, other characteristics may change and these changes may result in lengthening or shortening of the flame. Since the distance between the burner and the work in an automatic machine is fixed, any change in the length of the flame is liable to alter the rate at which the work is heated. Ideally, therefore, it is necessary to control the total heat input, i.e. maintain Wobbe Number constant, without thereby causing variations in the flame length.

Methods for controlling Wobbe Number are well known. For example, a small amount of air can be added to the gas to reduce its calorific value and increase its specific gravity so that the Wobbe Number of the mixture is lower than that of the neat gas. With such a mixture, adjustment of the proportion of air, either an increase or a decrease, may be made in such a way that the Wobbe Number of the mixture is kept constant, even though the calorific value of the neat gas may rise or fall. This control of the Wobbe Number of the air/gas mixture can be effected automatically by means of a Wobbe Number recorder which is an established gasworks instrument. However, the control of Wobbe Number alone is not always sufficient to maintain constant flame length as well as constant heat release from the flame.

Experience has shown that when variations in blue cone height are not large, and the concurrent variations in Wobbe Number due to mixture corrections are also small, satisfactory results are obtainable despite these variations in heat release. However if the variations in Wobbe Number of the mixture supplied to the working burners exceed about 3%, the performance of the working burners may be upset.

The applicants have found, however, that flame length is not greatly affected by small changes in pressure (of the order of ±20%) although such small pressure changes may have a corresponding and significant effect on the heat release. Accordingly, this invention makes use of pressure changes to regulate the heat release of the flame of the working burners to a constant level, without substantially affecting the flame length.

According to the present invention, means for automatically regulating the heat release from the flame of a working burner supplied with a gas/air mixture comprises means for generating a signal which is a function of the potential heat release of the said gas/air mixture and for applying that signal to a control device responsive thereto and arranged to vary the pressure of the gas/air mixture reaching the working burner in such a way as to regulate the heat release from the working burner flame to a substantially constant value without substantially altering the flame height.

The said means for generating a signal may comprise a control burner supplied with the gas/air mixture at the same pressure as that at the working burner, and a temperature-sensitive device (e.g. a thermocouple or expansion device) positioned to respond to the temperature of the products of combustion of the control burner, and in which the control means for varying the mixture pressure is responsive to the output signal from the temperature-sensitive device.

Alternatively a standard Wobbe Number recorder may be employed as the signal generating means used to regulate the pressure control means to maintain the heat release from the working burners at a constant value.

The present invention may in some cases be employed in conjunction with means for controlling the flame lengths of the working burners by means responsive to the blue cone height of a burner of the Bunsen type, the burner of the Bunsen type being supplied with the same gas/air mixture as the working burners and at constant pressure, and means being provided for automatically regulating the height of the blue cone in the flame of the burner of Bunsen type to a constant value by adjusting the proportion of air in the mixture supplied to the burner of Bunsen type, without altering the setting of the air inlet control of the burner of Bunsen type.

When gas is burnt in an aerated burner of the simple Bunsen burner type, the flame produced consists of an outer envelope and an inner blue-coloured cone. If the air inlet to the Bunsen burner is opened, rather more air is entrained by the stream of gas and the blue cone shortens. If the air shutter is closed less air is entrained and the cone lengthens. Under standard conditions, i.e. at a fixed gas pressure and with the aeration shutter also fixed, the height of the inner blue cone may vary if the gas characteristics vary. In particular if the gas supplied to the burner contains a high proportion of carbon monoxide the blue cone height tends to be low, while if the gas contains a small proportion of carbon monoxide the cone height is high, even though both gases may have the same calorific value and the same Wobbe Number. Experience has shown that if the gas is modified so that the blue cone height remains constant, then the lengths of the working flames in the burners of automatic appliances supplied with the same mixture also remain substantially constant.

The combination of heat release control by regulation of the pressure of the gas/air mixture supplied to the working burners, with supplementary flame height control by regulation of the blue cone height of a burner of Bunsen type to a constant value, provides extremely satisfactory control of the working conditions of the working burners.

The means for regulating the blue cone height of the flame of the burner of Bunsen type may take various forms, but in one arrangement it comprises a temperature-sensing element, for example a thermocouple, sited with its sensitive portion in the flame of the burner at a level near the tip of the aerated blue cone when the latter is at a required standard height, and actuating means coupled to the temperature-sensing element, and responsive to the output signal thereof, for adjusting the proportion of air in the air/gas mixture supplied to the burner and the working burners in accordance with the temperature sensed by the temperature-sensing element.

This arrangement relies upon the fact that the unburnt aerated gas which constitutes the interior of the blue cone of the flame of the burner of Bunsen type is cooler than the incandescent portion of the flame above the blue cone. Thus if the blue cone shortens, the temperature-sensing element will protrude further within the incandescent part of the flame above the tip of the blue cone where the temperature is higher, and it will transmit a correspondingly greater signal current to the actuating means. The actuating means, which may comprise a relay controlling a small electric motor, will respond to the increased signal current by adjusting the mixture proportioning control to reduce the proportion of air in the gas/air mixture, thereby increasing the height of the blue cone until it reaches its former level, and at the same time restoring the flame lengths of the working burners. If the blue cone of the burner flame lengthens beyond its standard height, the temperature of the thermocouple or other sensing device falls slightly, the signal current generated by it falls correspondingly, and the air control is opened to increase the proportion of air in the gas/air mixture until the blue cone shortens once more to its standard height and the working flames are also restored to their required lengths.

The actuating means responsive to the blue cone height of the control burner may be employed to adjust the mixture-proportioning control of a machine used to prepare the gas/air mixture for supply to the burners. The so-called Selas machine is a well-known example of such machines which incorporates a device which prevents variations in the demanded gas load from disturbing the preset 2:1 or other gas/air ratio, and also incorporates a proportioning valve for varying this ratio which would normally be adjusted by manual control. Once the proportioning valve has been set to a given ratio, variations in the load do not affect the ratio. If however the actuating motor or other mechanism which responds to the signals of the temperature-responsive device in the control burner flame is coupled to the proportioning valve of such a machine supplying the mixture to the control and working burners, the adjustments to the air/gas ratio required in order to maintain a constant cone height and working flame length are made automatically and without delay, since the mechanism for eliminating the effect of load variation remains in operation.

The invention according to another of its aspects comprises a method of heating a workpiece by a working gas burner as a step in a manufacturing process, for example in the manufacture of electric light bulbs or the soldering of metal cans, in which the working burner is supplied with a gas/air mixture at a pressure so controlled as to maintain the heat release from the working burner at a constant value.

In this method the flame length of the working burner may also be regulated to a substantially constant value by adjustment of the proportion of air in the said mixture, the said adjustment being effected automatically in response to variations in the blue cone height of the flame of a control burner supplied with the said mixture at a pressure proportional to that of the mixture supplied to the working burner, for example as sensed by a temperature-responsive element inserted into the control burner flame.

Figure 2:
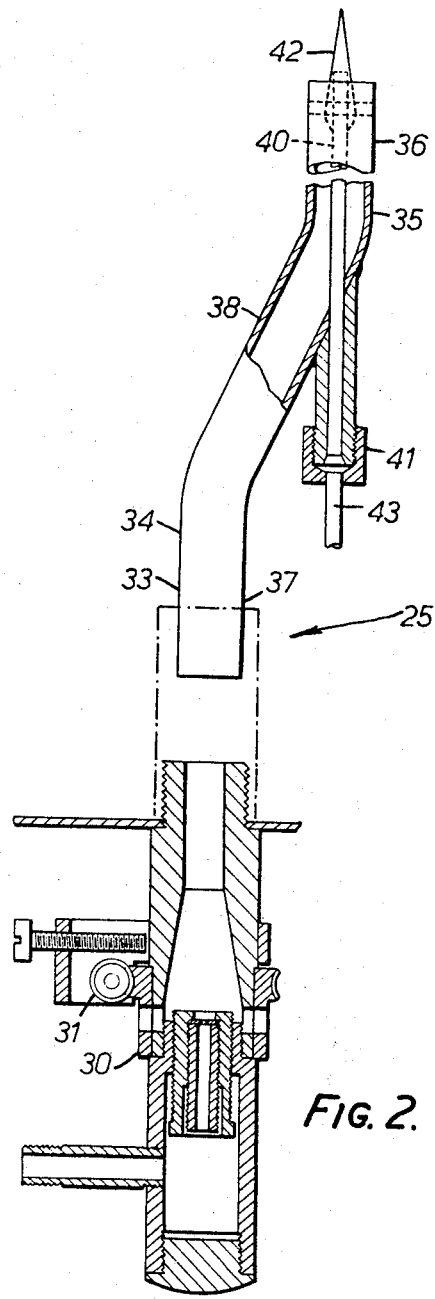
Figure 3:
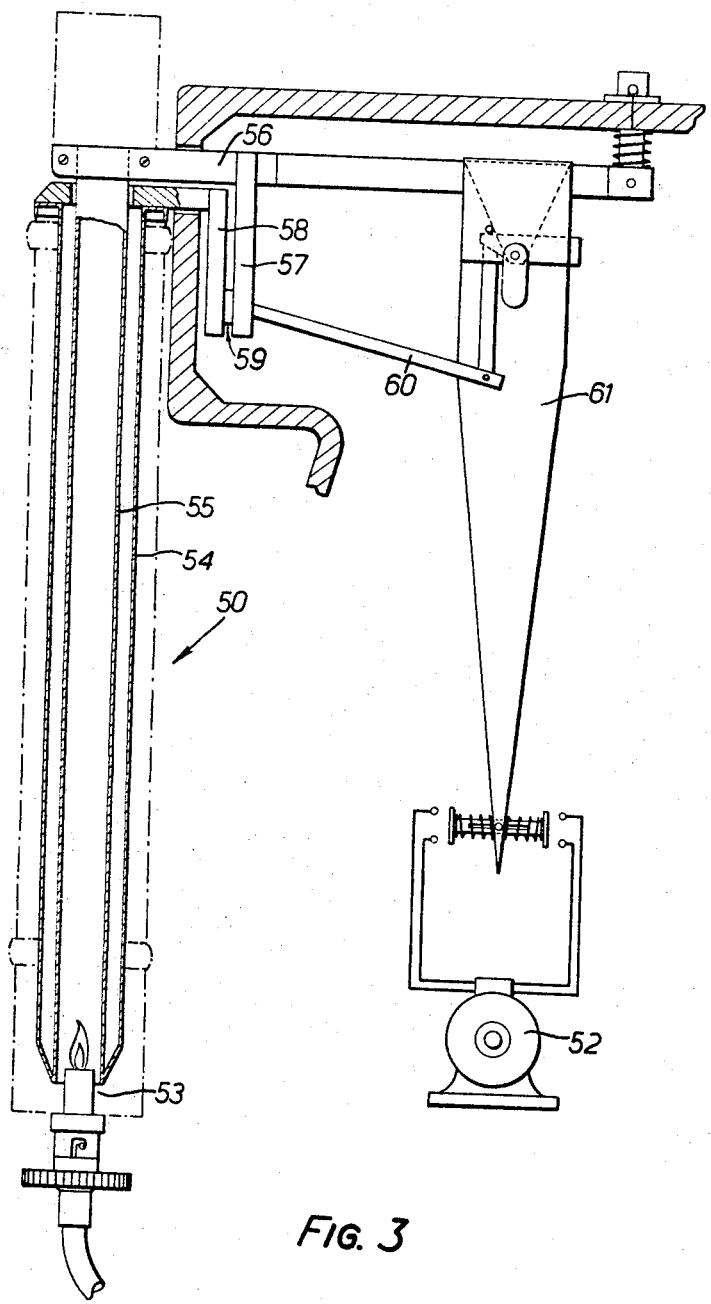
Figure 4:
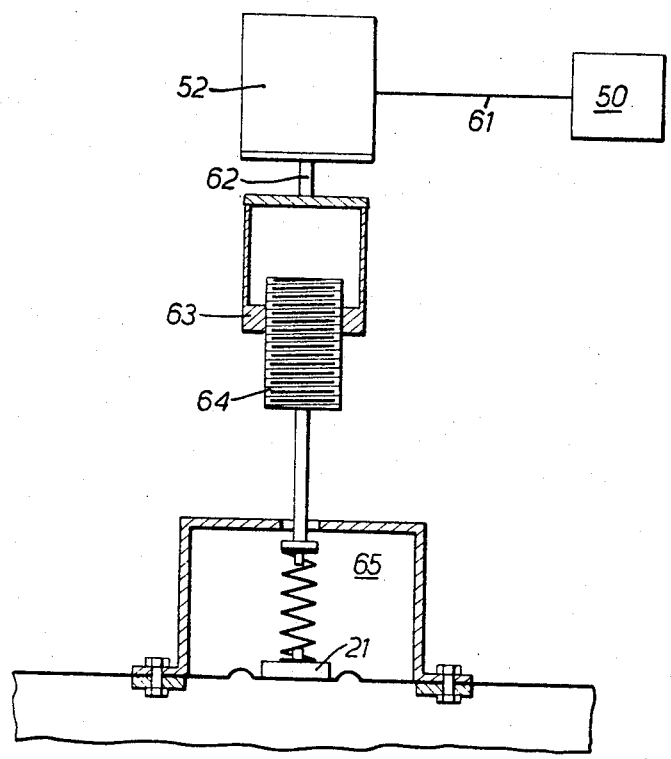

The invention may be carried into practice in various ways, but one specific embodiment will now be described by way of example with reference to the accompanying drawings, in which FIGURE 1 is a diagram of a control system for the flame conditions of a set of working burners, and FIGURE 2 is a sectional elevation on an enlarged scale of the first control burner for flame control by cone height regulation, FIGURE 3 is a diagrammatic sectional view on a larger scale of the Wobbe Number Recorder and the second control burner, and FIGURE 4 is a diagram illustrating the arrangement of the control motor for controlling the bypass valve of the gas governor in response to the movements of the pen of the Wobbe Number Recorder.

In the illustrated embodiment the invention is applied to the control of the working burners 10 of a set of automatic machines utilised for the flame heating of workpieces as a manufacturing step, for example the heating of glass tubes for the manufacture of electric lamp bulbs, or the soldering of metal cans. The working burners 10 are supplied through a pipe 11 with a mixture of town gas and air in the approximate ratio of 2:1 prepared by a Selas or other mixing machine 12 which receives the gas and air from separate sources 13 and 14 respectively and delivers the mixture at constant pressure in the required proportions determined by the setting of an adjustable proportioning valve 15. The mixing machine 12 incorporates a device which renders the mixture proportions independent of the load demanded. The gas from the source 13 is supplied through a zero gas governor 16, and the induced air from the source 14 passes through a low-loss filter 17. The mixture prepared by the machine is delivered through a non-return valve 18 to a compressor 20 across which is connected an adjustable pressure governor which includes a bypass valve 21, by means of which the pressure of the compressed mixture delivered from the outlet of the compressor to the pipe 11 and thence to the working burners 10 can be adjusted. An oil filter 22 is incorporated in the pipe 11.

A control burner 25 of the Bunsen type is supplied at constant governed pressure with a side stream of the gas/air mixture delivered by the compressor 20 through a branch pipe 26 provided with a filter 27 and governors 28, 29, and is utilised to regulate the gas/air ratio of the mixture in such a way as to maintain the flame length of the working burners constant. As shown in FIGURE 2 the control burner 25 has an air inlet shutter 30 whose opening can be preset to a required value by means of an adjusting screw 31, and is normally left unaltered in use. In the construction illustrated in FIGURE 2 the burner tube 33 of the control burner 25 is formed near its upper end with a double bend, consisting of two smooth bends 34, 35 through about 30° each spaced apart along the length of the tube, and in opposite directions, so that the upper end portion 36 of the burner tube is parallel to but offset from the base portion 37 of the tube, to which it is joined by the inclined intermediate portion 38 between the bends.

A thermocouple 40 of rod type is inserted into the interior of the upper end portion 36 of the tube 33, the thermocouple rod passing through the wall of the tube at the uppermost bend 35 and extending vertically upwardly coaxially within the top section 36 of the tube to protrude from its upper end. The electric leads of the thermocouple extend from a base fitting 41 at the lower end of the thermocouple rod outside the burner tube. The temperature-sensitive junction at the tip of the thermocouple rod 40 is located on the axis of the burner tube 33 just below the apex of the blue cone of the burner flame in service. In addition, as will be described below, the tip of the thermocouple rod 40 is enclosed in a shield 42 having a pointed upper end which protrudes above the blue cone into the incandescent portion of the flame in service. This arrangement enables the thermocouple 40 to be located in the required operating position without interfering with the smooth flow of the gas/air mixture through the burner tube to the flame. Preferably means is provided wherbey the thermocouple can be adjusted vertically with respect to the control burner tube.

As already described, the interior of the aerated blue cone of the control burner flame is cooler than the incandescent portion of the flame above the blue cone, so that if the blue cone shortens the shield 42 becomes hotter and heats the tip of the thermocouple 40 so that the output current of the latter increases, and vice versa. The thermocouple leads 43 are connected to an electric relay 44 which controls a small electric motor or other suitable mechanism 45, coupled to the proportioning valve control 15 of the gas/air mixing machine 12, the arrangement being such that an increase in the output current generated by the thermocouple 40 due to a shortening of the blue cone height of the control burner 25 will close the proportioning valve 15 slightly so as to reduce the proportion of air in the mixture supplied to the compressor 20, thereby restoring the blue cone height of the burner 25 to its original level and simultaneously regulating the flame height of the working burners 10 which are supplied with the same mixture. Conversely, an increase in blue cone height causes the proportioning valve 15 to be opened slightly to weaken the gas/air mixture until the blue cone height and the working flame lengths are again restored to their required values.

In order to reduce the speed of response of the mixture proportioning valve control to a change in blue cone height, it has been found advantageous to enclose the thermocouple junction in the gradually tapered hollow stainless steel shield 42, whose upper end is of pointed conical form, and which is mounted on the tip of the thermocouple rod 40 in a coaxial manner with its point directed upwardly to protrude beyond the blue cone, and smoothly curved at its base so as to fit closely around the thermocouple rod and offer little disturbance to the smooth flow of the gaseous mixture through the mouth of the burner tube 25. If this shield 42 is omitted, the response of the system may be too rapid, so that the system tends to "hunt" and the setting of the blue cone height becomes too critical.

To maintain the heat input to the working burners at a constant level despite variations in the Wobbe Number of the gas/air mixture due to the corrections effected by the blue cone control burner 25 and its associated control system, a second control burner is provided, not necessarily of Bunsen type but also supplied with the same gas/air mixture at a pressure equal to that of the working burners.

As shown in FIGURE 3 this second control burner 53 is incorporated in the base of a standard Wobbe Number Recorder which is generally indicated at 50, and which includes two coaxial cylindrical metal tubes 54 and 55 joined together at their lower ends, the control burner 53 being mounted below the open end of the inner tube 55. Governed air/gas mixture from the side stream in the branch pipe 26 is supplied to the control burner 53 through an orifice 51, so that the rate of gas flow is inversely proportional to the square root of the specific gravity. The heat of the burner 53 causes the inner metal tube 55 to expand with temperature rise in the upward direction relatively to the outer tube 54 and this movement of the tube 55 is sensed by a link 56 which causes an attachment 57 to move upwards relative to a cooperating member 58. This relative movement between the members 57 and 58 is detected by a connecting spring 59 between them which acuates a linkage 60 to move the pen 61 of the Wobbe Number Recorder. The deflection of pen 61 is therefore proportional not only to the calorific value of the gas mixture but also to the reciprocal of the square root of its specific gravity, i.e., is proportional to the Wobbe Number. For control purposes the pen 61 of the Wobbe Number Recorder 50 is made to actuate a relay-controlled elertric motor 52 which controls the governor bypass valve 21 connected between the input and discharge of the compressor 20. As shown diagrammatically in FIGURE 4, the deflection of the pen 61 is used to control the energisation and direction of rotation of the reversible electric motor 52, whose shaft 62 carries a threaded ring nut 63 into which is screwed a threaded lead-screw 64. The rotation of the motor 52 thus causes the lead-screw 64 to move vertically up or down, thus compressing or releasing a spring 65 which adjusts the setting of the governor bypass valve 21. The arrangement is such that an increased combustion products temperature sensed by the inner tube 55 of the Wobbe Number Recorder 50 will cause the pen 61 of the recorder 50 to move and energise the motor 52, causing it to adjust the bypass valve 21 in the sense to reduce the output pressure of the mixture supplied by the compressor 20 to the side stream and to the working burners 10, and so to reduce the heat input to these burners, and vice versa. In this way the system operates automatically to regulate the heat input to the working burners to a substantially constant value, in addition to regulating the flame length. Thus the temperature to which the workpieces are heated in a given time will be maintained substantially constant and the work will not be spoiled by temperature variations outside the tolerable range.

A typical mean pressure value for the gas/air mixture supplied by the compressor to the working burners and to the side stream is 40 inches water gauge. This would be reduced to say 3 inches water gauge for supply to the first control burner 25 but would not be reduced for the supply to the burner in the Wobbe Number Recorder 50.

What we claim as our invention and desire to secure by Letters Patent is:

1. Means for automatically regulating simultaneously the heat release and flame height of a working gas burner supplied with a gas/air mixture at a variable controlled pressure, which means comprises a first control burner supplied with a side stream of the said gas/air mixture at the controlled pressure, a temperature-responsive device positioned to respond to changes in the temperature of the products of combustion of the first control burner, the said temperature-responsive device producing a first output signal which is a function of the said combustion temperature and hence of the potential heat release of the said gas/air mixture, automatic pressure control means operable to vary the said controlled pressure of the gas/air mixture supplied to the working burner and in the side stream, said pressure control means being responsive to the said first output signal and being arranged a vary automatically the said controlled pressure in accordance with variations in the said combustion temperature in such a way as to regulate the heat release from the first control burner and also from the working burner to substantially constant values, and a second control burner comprising a burner of the Bunsen type also supplied with a side stream of the same gas/air mixture, means for governing the pressure of the gas/air mixture supplied to the burner of Bunsen type to a constant value, flame-sensing means associated with the burner of Bunsen type and arranged to produce a second output signal dependent on changes in the blue cone height of the flame of the burner of Bunsen type, and proportion control means responsive to the said second output signal and arranged to automatically adjust the proportion of air to gas in the said gas/air mixture supplied to the working burner and to the two control burners in accordance with changes in the blue cone height of said burner of Bunsen type and in such a way as to regulate said blue cone height to a constant value, whereby the height of the working burner flame as well as its heat release are regulated to substantially constant values.

2. Regulating means as claimed in claim 1 in which the flame-sensing means associated with the burner of Bunsen type comprises a temperature-responsive element inserted into the flame of the burner of Bunsen type at a level near the tip of the aerated blue cone of the said flame.

3. Regulating means as claimed in claim 1 wherein the proportion control means responsive to the blue cone height of the burner of Bunsen type is employed to adjust the mixture-proportioning control of a machine used to prepare the gas/air mixture for supply to the working burner.

4. Regulating means as claimed in claim 3 in which the temperature-responsive element associated with the burner of Bunsen type comprises a rod-type thermocouple inserted coaxially in the upper end of the burner tube of the burner of Bunsen type, the temperature sensitive junction portion of the thermocouple being enclosed in a hollow metal shield of elongated form whose upper end is of tapered form having a point located above the apex of the blue cone in service, and whose lower end is smoothly rounded and fits closely around the thermocouple rod.

5. Regulating means as claimed in claim 1, wherein said pressure control means comprises a bypass valve for varying the pressure of the gas/air mixture supplied to the working burner and said first control burner, spring means engaging said bypass valve and biasing the latter to closed position, and means responsive to said first output signal for varying the pressure of said spring means.

6. Regulating means as claimed in claim 5, said means for varying the spring pressure comprising a reversible motor under the control of said first output signal, a threaded nut rotatable by said motor, a threaded lead-screw in threaded engagement with said nut, said means on said lead-screw engaging said spring means.

7. Method for automatically regulating simultaneously the heat release and flame height of a working gas burner supplied with a gas/air mixture at a variable controlled pressure, which method comprises the steps of supplying to a first control burner a side stream of the said gas/air mixture at the controlled pressure, sensing changes in the temperature of the products of combustion of the first control burner, producing a first output signal which is a function of the said combustion temperature and hence of the potential heat release of the said gas/air mixture, varying the said controlled pressure of the gas/air mixture supplied to the working burner and in the side stream in response to the said first output signal in accordance with variations in the said combustion temperature in such a way as to regulate the heat release from the first control burner and also from the working burner to substantially constant values, supplying a side stream of the same gas/air mixture to a second control burner of the Bunsen type, governing the pressure of the gas/air mixture supplied to the burner of Bunsen type to a constant value, sensing the height of the blue cone of the flame of the second control burner, producing a second output signal dependent on changes in the blue cone height of the flame of the burner of Bunsen type, and adjusting the proportion of air to gas in the said gas/air mixture supplied to the working burner and to the two control burners in accordance with changes in the blue cone height of said burner of Bunsen type and in such a way as to regulate said blue cone height to a constant value, whereby the height of the working burner flame as well as its heat release are regulated to substantially constant values.

References Cited

UNITED STATES PATENTS

| 2,285,866 | 6/1942 | Markle | 158—130 |
| 3,262,486 | 7/1966 | Rose | 158—123 X |
| 3,301,307 | 1/1967 | Nishigaki et al. | 158—123 |

FREDERICK L. MATTESON, JR., *Primary Examiner.*

E. G. FAVORS, *Assistant Examiner.*